May 5, 1925.
A. M. DEGNER
1,536,427
HEATING APPARATUS FOR GAS FIRED OVENS
Filed Jan. 16, 1923
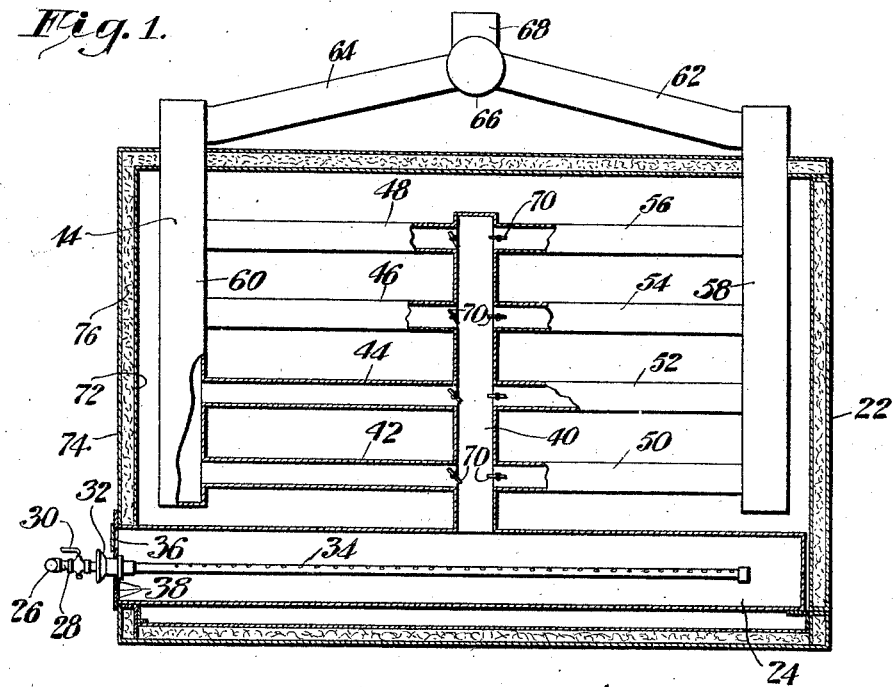
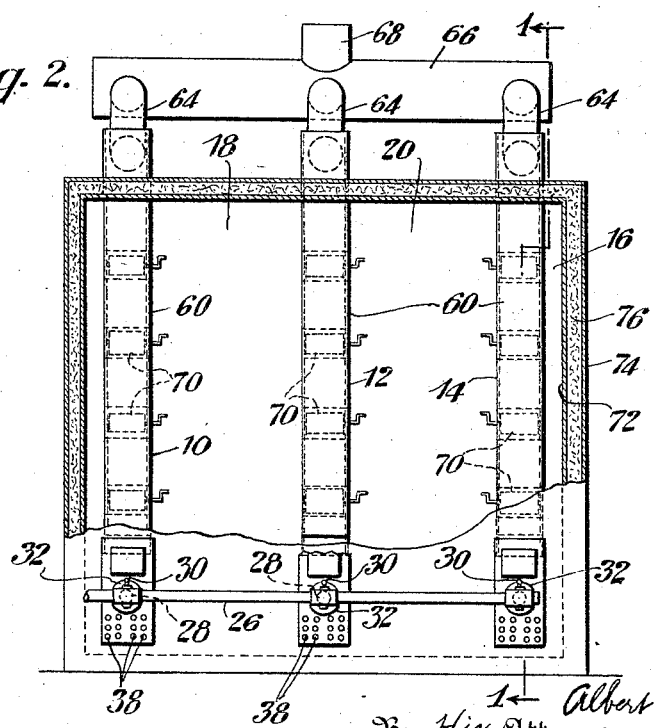
Inventor
Albert M. Degner
By His Attorney
Edmund G. Borden Patented May 5, 1925.

1,536,427

UNITED STATES PATENT OFFICE.

ALBIN MALMRAS DEGNER, OF BROOKLYN, NEW YORK, ASSIGNOR, BY MESNE ASSIGNMENTS, TO COMBUSTION UTILITIES CORPORATION, OF NEW YORK, N. Y., A CORPORATION OF MAINE.

HEATING APPARATUS FOR GAS-FIRED OVENS.

Application filed January 16, 1923. Serial No. 612,922.

*To all whom it may concern:*

Be it known that I, ALBIN M. DEGNER, a citizen of the United States of America, residing at Brooklyn, in the county of Kings, State of New York, have invented certain new and useful Improvements in Heating Apparatus for Gas-Fired Ovens; and I do hereby declare the following to be a full, clear, and exact description of the invention, such as will enable others skilled in the art to which it appertains to make and use the same.

The present invention relates to a heating apparatus for gas fired ovens of the type in which the contents of the oven are protected from direct contact with the products of combustion. More particularly, it relates to an oven of this type suitable for baking japanned goods and similar articles.

In ovens of this type it is frequently desirable to maintain substantially uniform temperatures throughout all parts of the oven or to maintain the maximum and minimum temperatures throughout the oven within definite, close limits. The exactness with which the temperature distribution can be controlled and the limits within which the temperatures may be maintained throughout the oven are limited in the ordinary type of oven by the difficulty or impossibility of controlling the distribution of the gaseous products of combustion throughout the heating flues and of maintaining the temperatures of the distributed gases in these flues within suitable temperature limits. If the hot gases are brought directly from the burners into flues from which the heat cannot be widely radiated or rapidly absorbed, there is a tendency for a very high temperature to be established at these points and a correspondingly lower temperature in those portions of the oven which are heated by partially cooled products of combustion. Or, if the hot products of combustion are permitted to remain adjacent to or pass very slowly from, the burners, and are not rapidly distributed while hot, there is a tendency for a hot zone to be maintained about the portion of the apparatus where the fuel is burned and for the other portions of the oven to be imperfectly heated.

An object of the present invention is to provide an indirectly heated gas fired oven in which the heat may be evenly distributed and the temperature throughout the oven may be maintained within narrow limits.

Another object of the invention is to provide indirectly heated gas fired ovens in which the distribution of the heat of the burning gases to various parts of the oven may be controlled at will.

Further objects and features of the invention are to distribute the hottest gases of combustion to those portions of the apparatus where there is the widest range for heat distribution and greatest capacity for heat absorption, to distribute the hot gases as widely as possible before they have an opportunity of giving up a large part of their heat and to increase the flexibility of control of the heating.

These and other features of the invention are described in the following specification and claims and illustrated in the accompanying drawings, in which:

Fig. 1 is a vertical sectional view on line 1—1 of Fig. 2 of an oven and heating apparatus embodying a preferred form of the invention, and, Fig. 2 is a rear view of the oven shown in Fig. 1, a portion of the oven being broken away to illustrate the interior construction.

In the present invention the gas for heating is burned in combustion chambers in the lower part of an oven of a suitable type, preferably insulated to avoid excessive heat loss, and the hot products of combustion are rapidly brought into a distributing flue and immediately distributed to a series of short transverse flues from which the heat is rapidly and uniformly radiated throughout the oven. One or more sets of combustion chambers and flues are employed, depending on the size of the oven, and the flues are placed at uniform distances apart to obtain the proper intensity of heating. The distribution flues containing the hottest gases are positioned in those portions of the oven in which the widest field for the reception and absorption of the radiated heat is provided in order that any tendency to a local concentration of heat and the building up of a high temperature may be avoided. Any tendency towards an unevenness of draft and consequent uneven distribution of heat to the heating flues may be corrected by means of suitable damper devices for individually controlling the passage of gases through the flues.

Referring more particularly to the accompanying drawings, a number of heating elements 10, 12 and 14 are positioned in spaced relation to an oven 16 to provide intervening spaces 18 and 20 in which articles to be heated may be placed. The heating elements are arranged to extend from the front to the rear of the oven to provide easy access through a door 22 for placing articles in the spaces 18 and 20 and are so spaced that heat may be radiated substantially uniformly throughout the spaces to maintain their temperatures at a definite relation to that of the heating elements. The fuel is burned and the products of combustion distributed throughout the heating elements in such a manner that a substantially uniform distribution of heat radiated from the faces of the heating elements may be obtained.

To this end, each heating element is provided with a separate combustion chamber 24 extending adjacent the bottom of the oven from the front wall to and through the rear wall. Fuel gas is supplied from a distributing main 26 through branch pipes 28, controlling valves 30 and air injectors 32 to burners 34 extending lengthwise of the combustion chambers. The combustion chambers are also provided in their rear walls with lighting doors 36 and air inlets 38. The hot products of combustion pass from the upper wall of the combustion chamber into a vertical distributing flue 40 from which they are distributed to a number of horizontal heating flues 42, 44, 46 and 48, on one side, and 50, 52, 54 and 56 on the opposite side of the distributing flue. The waste gases leaving the heating flues are collected in vertical collecting flues 58 and 60 at the front and rear of the heating elements respectively and pass through branch flues 62 and 64 to a collecting header 66 and a stack 68.

Through this arrangement the hot gases are brought very rapidly to the heating flues, the gases reaching the uppermost flues 48 and 56 having lost very little heat in their short, rapid movement through the distributing flue and entering the heating flues at very nearly the same temperature as those entering the lowermost flues 42 and 50. A substantially uniform vertical distribution of heat is thus insured. The heating gases are cooled by the radiation of heat in their passage through the distributing and heating flues and are at a lower temperature and have less heat radiating and heat giving capacity towards the end of their paths. The arrangement of the distributing flues centrally of the heat receiving articles, as described above, however, provides a wider field for the distribution and absorption of the radiated heat and thus counterbalances the greater intensity of radiation.

To enable the distribution of heat to the various heating flues to be controlled, each flue is provided with a damper 70 at its entrance end. Through these dampers the quantity of heated gases sent to any part of the heating elements may be controlled to provide uniform heating, or the dampers may be partly or wholly closed at certain localities to lessen the heating intensity where but little absorption of heat takes place or a lower temperature is desired, and where little heat is therefore required to maintain the required temperature. The heat generated in each heating element may also be controlled by means of the gas control valves 30 to obtain the proper temperature regulation throughout the width of the furnace.

The oven is insulated from loss of heat, the heat supplied through the heating elements being absorbed by the articles placed between the elements. For this purpose the walls and doors of the oven are formed of an inner wall 72 and an outer wall 74 between which is placed a filling of insulating material 76. Any heat radiated to the inner walls 72 is thereby reflected to the articles in the oven, eliminating any unnecessary loss of heat from the heating flues or collecting flues.

With the construction outlined above the temperature in the oven may be maintained substantially uniform throughout the entire area. By the dampers 70 however the temperatures at the different vertical levels of the oven may be varied in order to maintain any desired temperatures. For example, when baking japanned articles or enameled articles which require different temperatures, these materials may be located at different levels and the dampers regulated to maintain the desired temperatures. With an oven of the type outlined, and particularly annealing and japanning ovens which have large doors, it is often difficult to maintain the proper temperatures near the door openings. With the construction described above, however, the dampers may set so as to throw the heat either to the front of the oven or to the rear of the oven, and thus insure a uniform baking of the japan or enamel. After the oven has once been filled with the articles to be treated and it is found that the intensity of the heat is not properly distributed, the dampers may be set to throw the heat in the desired position before filling the oven for the next baking operation.

Having described the invention, what I claim and desire to secure by Letters Patent is:

1. A heating element for ovens which comprises, a combustion chamber, a vertical flue extending upwardly therefrom, heating flues branching from said distributing flue, upwardly extending receiving flues at the ends of said branching flues, and stack connections at the upper ends of said receiving flues, 2. A heating element for ovens which comprises, an elongated horizontal combustion chamber, a vertical flue extending upwardly from the central portion of the combustion chamber, branch flues extending horizontally over said combustion chamber and vertical receiving flues at the outer ends of said branch flues.

3. A heating element for ovens which comprises, an elongated horizontal combustion chamber, a vertical flue extending upwardly from the central portion of said combustion chamber, branch flues extending horizontally from said vertical flue over said combustion chamber, means to control the circulation of gases through the horizontal flues and receiving flues at the outer ends of said horizontal flues.

4. A heating element for ovens which comprises, an elongated horizontal combustion chamber, a vertical flue extending upwardly from the central portion of said combustion chamber and closed at its upper end, branch flues extending horizontally from said vertical flue over said combustion chamber, and receiving flues connected to the outer ends of said branch flues and having an outlet for gases received from said branch flues.

5. A heating element for ovens which comprises, a combustion chamber, a vertical flue extending upwardly from said combustion chamber, heating flues branching from said distributing flue, individual dampers in said heating flues, and upwardly extending receiving flues at the ends of said heating flues.

6. An oven, combustion chambers spaced at regular intervals in the lower portion of said oven, distributing flues rising from said combustion chambers, heating flues branching from said distributing flues, and receiving flues at the ends of said heating flues.

7. An oven, elongated, horizontal combustion chambers positioned in the lower portion of said oven and extending from the front to the rear of said oven, distributing flues extending upwardly from said combustion chambers and positioned to have a wide radiating range, branch flues extending to the front and rear of said distributing flue, collecting flues to receive gases from the ends of said branch flues and means for controlling the volume of gases passing through each combustion chamber.

8. An oven, elongated, horizontal combustion chambers positioned in the lower portion of said oven and extending from the front to the rear of said oven, distributing flues extending upwardly from said combustion chambers, branch flues extending forwardly and rearwardly of said distributing flues, collecting flues to receive gases from the ends of said branch flues and means to vary the volume of gases passing through flues at different levels or for concentrating the flow of gases to the rear or front flues.

9. An oven, elongated, horizontal combustion chambers extending from front to rear in spaced relation in the lower portion of said oven, distributing flues extending upwardly from said combustion chambers, superposed heating flues extending forwardly and rearwardly from said distributing flues, collecting flues for receiving gases from the free ends of said heating flues, burners in said combustion chambers, means for supplying gas to said burners, and means for controlling the quantity of fuel supplied to each combustion chamber.

In testimony whereof I affix my signature.

ALBIN MALMRAS DEGNER.